United States Patent
Masuda et al.

(10) Patent No.: US 9,593,404 B2
(45) Date of Patent: Mar. 14, 2017

(54) NITROCARBURIZED CRANKSHAFT AND METHOD OF MANUFACTURING THE SAME

(71) Applicants: Hiroki Masuda, Saitama (JP); Hideki Matsuda, Saitama (JP); Ayumi Yamazaki, Aichi (JP); Shinichiro Kato, Aichi (JP); Takahiro Miyazaki, Aichi (JP)

(72) Inventors: Hiroki Masuda, Saitama (JP); Hideki Matsuda, Saitama (JP); Ayumi Yamazaki, Aichi (JP); Shinichiro Kato, Aichi (JP); Takahiro Miyazaki, Aichi (JP)

(73) Assignees: DAIDO STEEL CO., LTD., Aichi (JP); HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 14/263,254

(22) Filed: Apr. 28, 2014

(65) Prior Publication Data

US 2014/0326365 A1 Nov. 6, 2014

(30) Foreign Application Priority Data

May 1, 2013 (JP) ................. 2013-096377

(51) Int. Cl.
*C23C 8/32* (2006.01)
*C21D 9/30* (2006.01)
(Continued)

(52) U.S. Cl.
CPC .................. *C23C 8/32* (2013.01); *C21D 9/30* (2013.01); *C23C 8/02* (2013.01); *F16C 3/06* (2013.01); *F16C 3/08* (2013.01)

(58) Field of Classification Search
CPC .................................... C23C 8/76; C23C 8/32
See application file for complete search history.

(56) References Cited

U.S. PATENT DOCUMENTS

| | | | | |
|---|---|---|---|---|
| 2,449,662 A | * | 9/1948 | Leeson | F16C 33/06 29/898.054 |
| 2011/0186182 A1 | * | 8/2011 | Chida | B32B 15/04 148/318 |
| 2013/0087250 A1 | * | 4/2013 | Chida | C22C 38/001 148/318 |

FOREIGN PATENT DOCUMENTS

| | | | | |
|---|---|---|---|---|
| CA | 2 243 123 | * | 1/2002 | C22C 38/14 |
| DE | 697 18 784 | | 12/2003 | |

(Continued)

OTHER PUBLICATIONS

Benninghoff, Warmebedhandlung der Bau and Wekzeugstable, 3$^{rd}$ Ed., Basel: BAZ Book Publisher, pp. 262-264, 1978.*

(Continued)

*Primary Examiner* — Jessee Roe
(74) *Attorney, Agent, or Firm* — Greenblum & Bernstein, P.L.C.

(57) ABSTRACT

Provided is a method of manufacturing a nitrocarburized crankshaft which is obtained by subjecting a bainitic microalloyed steel to a forging and a machining, and further subjecting the bainitic microalloyed steel to at least a strain releasing heat treatment and a subsequent nitrocarburizing treatment, the bainitic microalloyed steel containing, as essentially added elements, in terms of mass %: 0.10% to 0.40% of C; 0.10% to 1.0% of Si; 1.0% to 2.0% of Mn; 0.05% to 0.40% of Mo; and 0.05% to 0.40% of V, and the bainitic microalloyed steel optionally further containing, as arbitrarily added elements, in terms of mass %: 0.01% to 0.1% of S; 0.005% to 0.2% of Ti; 0.001% to 0.03% of Al; 0.50% or less of Cr; 0.5% or less of Cu; and 0.5% or less of Ni, with the balance being Fe and unavoidable impurities.

9 Claims, 1 Drawing Sheet (51) Int. Cl.
   *F16C 3/06*   (2006.01)
   *C23C 8/02*   (2006.01)
   *F16C 3/08*   (2006.01)

(56) References Cited

FOREIGN PATENT DOCUMENTS

| EP | 0 903 418 | 3/1999 |
|---|---|---|
| JP | S63-162852 A | 6/1988 |
| JP | 2001-123240 A | 8/2001 |
| JP | 2007-146232 | 6/2007 |
| JP | 2010-189697 A | 2/2010 |
| JP | 2010-270390 A | 2/2010 |
| JP | 2011-094203 | 5/2011 |

OTHER PUBLICATIONS

Gellert et al., Kleine Enzyklopädie Mathematik, 10., completely revised version, Leipzig: VEB Bibliographisches Institut, pp. 58-60, 1977.

Benninghoff, Wärmebehandlung der Bau and Wekzeugstähle, 3$^{rd}$ Ed., Basel: BAZ Book Publisher, pp. 262-264, 1978.

Office Action issued in Germany Counterpart Patent Appl. No. 10 2014 106 004.0, dated Mar. 10, 2016, along with an English translation thereof.

Japanese Office Action issued with respect to Application No. 2013-096377, dated Sep. 27, 2016.

* cited by examiner

NITROCARBURIZED CRANKSHAFT AND METHOD OF MANUFACTURING THE SAME

FIELD OF THE INVENTION

The present invention relates to a nitrocarburized crankshaft which is obtained by performing a nitrocarburizing treatment on a microalloyed steel and a method of manufacturing the nitrocarburized crankshaft, and particularly, to a nitrocarburized crankshaft which is obtained by performing a nitrocarburizing treatment on a bainitic microalloyed steel and a method of manufacturing the nitrocarburized crankshaft.

BACKGROUND OF THE INVENTION

In the cases of crankshafts which are used in reciprocating engines of vehicles, a steel material made from carbon steel or low alloy steel is hot-forged to be roughly molded, subjected to a heat treatment such as thermal refining, and then machined into a shape of a crankshaft bent in a longitudinal direction. Furthermore, a surface hardening treatment such as nitrocarburizing is performed. In addition, in the case where a microalloyed steel is used, the heat treatment after the hot forging may be omitted and the machining may be directly performed. Particularly, in the case where a bainitic microalloyed steel is used to give a micro metal structure mainly composed of bainite, the heat treatment such as thermal refining can be omitted by controlling the thermal history during the hot forging, and fatigue strength as crankshafts can be improved.

For example, Patent Document 1 discloses a method of manufacturing a nitrocarburized machine part such as a crankshaft using a bainitic microalloyed steel with omission of a heat treatment after hot forging. By adjusting the component composition of the microalloyed steel and by optimizing a heating temperature before hot forging and a cooling rate after forging, the ratio of a bainite structure in the micro metal structure of the hot-forged product is adjusted to 50% or greater, and the fatigue strength can be increased. In addition, by optimizing nitrocarburizing treatment conditions, a nitrocarburized machine part having: such mechanical properties that it can be subjected to machining such as cutting in terms of industrial production; and high fatigue strength can be obtained even when a heat treatment after hot forging is omitted. In greater detail, by adjusting the component composition of the microalloyed steel, a DI value which is an index of hardenability and a Kp value which is an index of a critical cooling temperature at which pearlite is generated are limited to predetermined ranges, and the carbon equivalents of the contained elements are limited, whereby hardness which is required for machine parts and cutting processability (machinability) are secured, and the fatigue strength can be further improved with the contents of Si and Mn.

In addition, since crankshafts having a shape bent in a longitudinal direction are easily bent during a surface hardening treatment, it may be necessary to perform a bending straightening treatment for straightening the bending after the surface processing. Meanwhile, in general, steel materials having high fatigue strength as a crankshaft have high mechanical strength, and thus it may be difficult to perform such a bending straightening treatment.

For example, Patent Document 2 discloses a method of manufacturing a nitrocarburized crankshaft, in which a bainitic microalloyed steel having Mo and V added thereto is used and a strain releasing heat treatment for releasing processing strain is applied before a nitrocarburizing treatment step to suppress bending occurring by the nitrocarburizing treatment to thus omit a bending straightening treatment after the nitrocarburizing treatment. Such a strain releasing heat treatment is preferably performed for 10 minutes to 180 minutes at 300° C. to 650° C. in consideration of the release of the processing strain and a reduction in strength due to overaging. Furthermore, it is disclosed that by adjusting the contents of C, Si, Mn, Cr, Mo, and V and by limiting a Kf value which is an index of the generation and stabilization of bainite, a Hf value which is an index of hardness of the hot-forged product, and a Hg value which is an index of internal hardness after the nitrocarburizing treatment to predetermined ranges, the ratio of the bainite structure is adjusted to 70% or greater, and by controlling the hardness after hot forging, machinability can be secured and the internal hardness after the nitrocarburizing treatment can be increased.

[Patent Document 1] JP-A-2007-146232
[Patent Document 2] JP-A-2011-094203

SUMMARY OF THE INVENTION

In the manufacturing of a nitrocarburized crankshaft, using a bainitic microalloyed steel is preferred from the viewpoint of manufacturability, because a heat treatment after hot forging can be omitted, and moreover, bending occurring by a nitrocarburizing treatment is suppressed, and thus a bending straightening treatment can be omitted. However, it is not preferable that mechanical strength as the crankshaft be sacrificed, because the bending occurring by a nitrocarburizing treatment is suppressed.

The invention is contrived in view of the above-described circumstances, and an object thereof is to provide a nitrocarburized crankshaft having excellent manufacturability and a method of manufacturing the nitrocarburized crankshaft without sacrificing mechanical strength as the crankshaft.

The present invention provides a method of manufacturing a nitrocarburized crankshaft which is obtained by subjecting a bainitic microalloyed steel to a forging and a machining, and further subjecting the bainitic microalloyed steel to at least a strain releasing heat treatment and a subsequent nitrocarburizing treatment, the bainitic microalloyed steel containing, as essentially added elements, in terms of mass %: 0.10% to 0.40% of C; 0.10% to 1.0% of Si; 1.0% to 2.0% of Mn; 0.05% to 0.40% of Mo; and 0.05% to 0.40% of V, and the bainitic microalloyed steel optionally further containing, as arbitrarily added elements, in terms of mass %: 0.01% to 0.1% of S; 0.005% to 0.2% of Ti; 0.001% to 0.03% of Al; 0.50% or less of Cr; 0.5% or less of Cu; and 0.5% or less of Ni, with the balance being Fe and unavoidable impurities, wherein at least a content of P as one of the unavoidable impurities is suppressed to be 0.025% or less, wherein the microalloyed steel is selected so as to satisfy:

$$[C]+0.27[Mn]+0.32[Cr]+0.27[Mo]+0.38[V] \geq 0.72,$$

$$[C]+0.01[Si]+0.09[Mn]+0.13[Cr]+0.12[Mo]+0.28[V] < 0.65, \text{ and}$$

$$[C]+0.11[Si]+0.11[Mn]+0.09[Cr]+0.21[Mo]+0.60[V] \geq 0.54,$$

in which [M] represents a content of element M in terms of % by mass, and wherein the strain releasing heat treatment is performed to satisfy the following expressions regarding a holding temperature T (° C.) and a holding time t (hr):

$$21.6+14.2[C]+1.5[Si]+2.6[Mn]+6.5[Cr]+2.7[Mo]+1.6[V]+10^{-7}\times\gamma_{h1}^2-3.7\times10^{-3}\times\gamma_{h1}<0.70, \text{and}$$

$$\gamma_{h1}=(T+273)\times(20+\text{Log}(t)).$$

According to the invention, without sacrificing mechanical strength as the crankshaft, processing strain and bending occurring by the nitrocarburizing treatment due to residual austenite are suppressed, and thus a subsequent bending straightening treatment can be omitted. That is, the method of manufacturing a nitrocarburized crankshaft having excellent manufacturability in which excellent mechanical properties is secured can be provided.

In the invention, it is preferred that the bainitic microalloyed steel is subjected to the forging after heating the bainitic microalloyed steel to a temperature in a range of 1150° C. or more and lower than 1350° C., and then the forged steel is at least cooled at a cooling rate controlled to be within a range of from 0.25° C./sec to 1.50° C./sec in a carbon diffusion temperature range, thereby obtaining a hardness of less than 33.0 HRC. According to the invention, the method of manufacturing a nitrocarburized crankshaft having excellent manufacturability in which excellent mechanical properties is secured can be provided.

In the invention, it is preferred that in the strain releasing heat treatment, the holding temperature T is set in a range of from 400° C. to 600° C. and the holding time t is set in a range of from 0.5 hours to 5.0 hours so as to control an amount of residual γ to less than 5.0%. According to the invention, the method of manufacturing a nitrocarburized crankshaft having excellent manufacturability in which excellent mechanical properties is secured can be provided.

In the invention, it is preferred that the nitrocarburizing treatment is performed for 0.5 hours or longer under a gas atmosphere at a temperature in a range of from 550° C. to 650° C., and a core part has a hardness of 270 HV or greater. According to the invention, the method of manufacturing a nitrocarburized crankshaft having excellent manufacturability in which excellent mechanical properties is secured can be provided.

Moreover, the invention provides a nitrocarburized crankshaft obtained by subjecting a bainitic microalloyed steel to a forging and a machining and further subjecting the bainitic microalloyed steel to at least a stain releasing heat treatment and a subsequent nitrocarburizing treatment, the bainitic microalloyed steel containing, as essentially added elements, in terms of mass %: 0.10% to 0.40% of C; 0.10% to 1.0% of Si; 1.0% to 2.0% of Mn; 0.05% to 0.40% of Mo; and 0.05% to 0.40% of V, and the bainitic microalloyed steel optionally further containing, as arbitrarily added elements, in terms of mass %: 0.01% to 0.1% of S; 0.005% to 0.2% of Ti; 0.001% to 0.03% of Al; 0.50% or less of Cr; 0.5% or less of Cu; and 0.5% or less of Ni, with the balance being Fe and unavoidable impurities, wherein at least a content of P as one of the unavoidable impurities is suppressed to be 0.025% or less, wherein the microalloyed steel satisfies the following expressions:

$$[C]+0.27[Mn]+0.32[Cr]+0.27[Mo]+0.38[V]\geq0.72,$$

$$[C]+0.01[Si]+0.09[Mn]+0.13[Cr]+0.12[Mo]+0.28[V]<0.65, \text{and}$$

$$[C]+0.11[Si]+0.11[Mn]+0.09[Cr]+0.21[Mo]+0.60[V]\geq0.54,$$

in which [M] represents a content of element M in terms of % by mass, and wherein an amount of residual γ is controlled to be less than 5.0%, and a core part has a hardness of 270 HV or greater.

According to the invention, a nitrocarburized crankshaft having excellent mechanical properties and excellent manufacturability can be provided.

DETAILED DESCRIPTION OF THE INVENTION

A method of manufacturing a crankshaft which is a subject of the invention is a method of manufacturing a nitrocarburized crankshaft which is obtained by subjecting a bainitic microalloyed steel to forging and machining and by performing at least a strain releasing heat treatment and a subsequent nitrocarburizing treatment. In the invention, (1) a heat treatment for tempering of martensite is omitted using a bainitic microalloyed steel, (2) using the bainitic microalloyed steel having a specific component composition, the amount of residual γ after forging is adjusted and a strain releasing heat treatment is performed after machining, whereby the "bending" in the next nitrocarburizing treatment can be suppressed and the mechanical strength of a part corresponding to a core part of the crankshaft is adjusted, and (3) the fatigue strength as the crankshaft is improved with a surface hardening treatment by the nitrocarburizing treatment. Particularly, by reducing the amount of residual γ after the strain releasing heat treatment, the "bending" in the nitrocarburizing treatment can be suppressed and a subsequent process for straightening is thus not required, whereby the crankshaft main body can be hardened to increase the mechanical strength thereof compared to conventional cases in the strain releasing heat treatment.

First, a typical method of manufacturing a nitrocarburized crankshaft which is a subject of the present specification will be described based on FIG. 1. Parameters in the respective steps, e.g., a temperature of a heat treatment, a holding time, and a cooling rate depend on the component composition of a steel material, and this will also be noted in proving tests.

Figure 1:
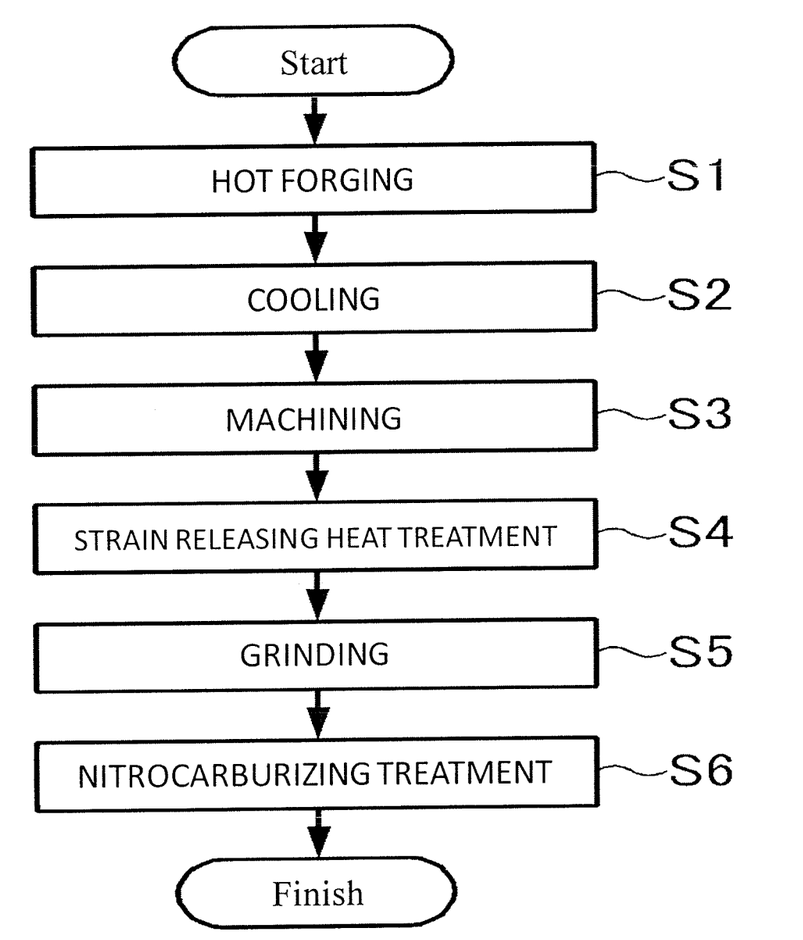
FIG. 1 is a flow diagram showing a method of manufacturing a crankshaft according to the invention.

First, as shown in FIG. 1, a steel material having a predetermined component composition is heated and roughly molded into an approximately crankshaft shape through hot forging (S1). The heating temperature is generally 1100° C. or higher. In the case of a steel material having a component composition to be described later, the heating temperature is preferably in the range of 1150° C. to 1350° C.

The hot-forged body after the rough molding is cooled so that the ratio of a bainite structure as a micro metal structure becomes high, for example, 70% or greater, and preferably 80% or greater in terms of a sectional area ratio (S2). For example, at least in a carbon diffusion temperature range, the hot-forged body after the rough molding is cooled at a cooling rate controlled to be within the range of from 0.25° C./sec to 1.50° C./sec.

Next, the cooled hot-forged body is machined into a crankshaft shape (S3). Easiness in the machining of the hot-forged body depends on hardness of the steel material after the hot forging. The machining is easily performed in the case where the hardness is less than 33.0 HRC.

The hot-forged body after the machining is subjected to a strain releasing heat treatment (S4). In the heat treatment, residual stress accumulated until the termination of the machining is released, and residual γ (residual austenite) is decomposed. The decomposition of the residual γ depends on the temperature and the time of the heat treatment and the component composition of the steel material. A processing temperature T (° C.) is preferably controlled to be within the range of from 400° C. to 600° C., and a processing time t (hr) is preferably controlled to be within the range of from 0.5 hours to 5.0 hours.

Surface grinding is performed (S5), and a surface hardening treatment is performed through a nitrocarburizing treatment (S6). In the nitrocarburizing treatment, a hard layer is formed on the surface layer by heating and holding only for at least 0.5 hours in the range of from 550° C. to 650° C. under an ammonia gas atmosphere. The steel material is age-hardened or softened at the processing temperature.

Next, with steels having component compositions of Examples 1 to 16 and Comparative Examples 1 to 17 shown in Table 1, various test pieces obtained using the manufacturing method shown in FIG. 1 are manufactured, and the nitrocarburized crankshafts obtained using the same manufacturing method are tested. This test will be described.

TABLE 1

| | COMPONENT COMPOSITION (MASS %) | | | | | | STRAIN RELEASING HEAT TREATMENT | |
|---|---|---|---|---|---|---|---|---|
| | C | Si | Mn | Cr | Mo | V | TEMPERATURE (° C.) | TIME (Hr) |
| LOWER LIMIT | 0.10 | 0.10 | 1.0 | — | 0.05 | 0.05 | 400 | 0.5 |
| UPPER LIMIT | 0.40 | 1.0 | 2.0 | 0.5 | 0.40 | 0.40 | 600 | 5.0 |
| Example 1 | 0.11 | 0.69 | 1.42 | 0.25 | 0.32 | 0.23 | 550 | 2.0 |
| Example 2 | 0.36 | 0.31 | 1.70 | 0.29 | 0.17 | 0.16 | 550 | 2.0 |
| Example 3 | 0.21 | 0.13 | 1.92 | 0.33 | 0.29 | 0.22 | 550 | 2.0 |
| Example 4 | 0.19 | 0.97 | 1.64 | 0.33 | 0.31 | 0.13 | 550 | 2.0 |
| Example 5 | 0.29 | 0.64 | 1.07 | 0.34 | 0.34 | 0.24 | 550 | 2.0 |
| Example 6 | 0.19 | 0.39 | 1.95 | 0.33 | 0.28 | 0.25 | 550 | 2.0 |
| Example 7 | 0.25 | 0.41 | 1.89 | 0.02 | 0.31 | 0.14 | 550 | 2.0 |
| Example 8 | 0.18 | 0.55 | 1.55 | 0.48 | 0.32 | 0.22 | 550 | 2.0 |
| Example 9 | 0.23 | 0.69 | 1.90 | 0.29 | 0.06 | 0.25 | 550 | 2.0 |
| Example 10 | 0.16 | 0.70 | 1.77 | 0.31 | 0.38 | 0.21 | 550 | 2.0 |
| Example 11 | 0.28 | 0.35 | 1.52 | 0.15 | 0.32 | 0.08 | 550 | 2.0 |
| Example 12 | 0.27 | 0.33 | 1.65 | 0.10 | 0.34 | 0.38 | 550 | 2.0 |
| Example 13 | 0.15 | 0.65 | 1.43 | 0.33 | 0.16 | 0.21 | 400 | 0.5 |
| Example 14 | 0.25 | 0.45 | 1.85 | 0.27 | 0.33 | 0.16 | 600 | 5.0 |
| Example 15 | 0.19 | 0.37 | 1.67 | 0.23 | 0.29 | 0.15 | 350 | 5.0 |
| Example 16 | 0.17 | 0.56 | 1.55 | 0.34 | 0.21 | 0.22 | 450 | 6.0 |
| COMPARATIVE EXAMPLE 1 | 0.08 | 0.64 | 1.51 | 0.25 | 0.23 | 0.16 | 550 | 2.0 |
| COMPARATIVE EXAMPLE 2 | 0.41 | 0.75 | 1.85 | 0.31 | 0.32 | 0.25 | 550 | 2.0 |
| COMPARATIVE EXAMPLE 3 | 0.15 | 0.08 | 1.93 | 0.18 | 0.32 | 0.11 | 550 | 2.0 |
| COMPARATIVE EXAMPLE 4 | 0.30 | 1.08 | 1.68 | 0.31 | 0.34 | 0.22 | 550 | 2.0 |
| COMPARATIVE EXAMPLE 5 | 0.16 | 0.53 | 0.96 | 0.35 | 0.23 | 0.21 | 550 | 2.0 |
| COMPARATIVE EXAMPLE 6 | 0.31 | 0.70 | 2.08 | 0.25 | 0.25 | 0.28 | 550 | 2.0 |
| COMPARATIVE EXAMPLE 7 | 0.29 | 0.78 | 1.78 | 0.52 | 0.28 | 0.32 | 550 | 2.0 |
| COMPARATIVE EXAMPLE 8 | 0.18 | 0.52 | 1.40 | 0.23 | 0.00 | 0.20 | 550 | 2.0 |
| COMPARATIVE EXAMPLE 9 | 0.29 | 0.79 | 1.88 | 0.37 | 0.46 | 0.29 | 550 | 2.0 |
| COMPARATIVE EXAMPLE 10 | 0.20 | 0.54 | 1.43 | 0.21 | 0.15 | 0.00 | 550 | 2.0 |
| COMPARATIVE EXAMPLE 11 | 0.28 | 0.71 | 1.87 | 0.34 | 0.32 | 0.42 | 550 | 2.0 |
| COMPARATIVE EXAMPLE 12 | 0.27 | 0.65 | 1.74 | 0.33 | 0.26 | 0.30 | 350 | 5.0 |
| COMPARATIVE EXAMPLE 13 | 0.22 | 0.78 | 1.76 | 0.29 | 0.28 | 0.25 | 610 | 0.5 |
| COMPARATIVE EXAMPLE 14 | 0.27 | 0.97 | 1.84 | 0.25 | 0.40 | 0.24 | 550 | 2.0 |
| COMPARATIVE EXAMPLE 15 | 0.30 | 0.56 | 1.95 | 0.31 | 0.33 | 0.30 | 550 | 2.0 |
| COMPARATIVE EXAMPLE 16 | 0.16 | 0.45 | 1.41 | 0.22 | 0.17 | 0.06 | 550 | 2.0 |
| COMPARATIVE EXAMPLE 17 | 0.31 | 0.31 | 1.78 | 0.45 | 0.24 | 0.21 | 600 | 5.0 |

First, an ingot having a predetermined component composition was heated and held at a temperature of 1250±50° C., was forged into a round bar having an approximately circular cylindrical shape with a diameter of 45 mm and a length of 250 mm, and was cooled at a cooling rate of from 0.25° C./sec to 1.50° C./sec. From the round bar, a test piece (hereinafter, referred to as "test piece A") for use in the measurement of the hardness after hot forging and the like for measuring the hardness after hot forging and a bainite structure area ratio was cut, and a rotation bending fatigue test piece and a structure test piece (hereinafter, referred to as "test piece B") for measuring the fatigue strength and the amount of residual γ after the strain releasing heat treatment were machined. In addition, a forged body forged and cooled in the same manner was machined to produce a bending amount measurement test piece with a diameter of 20 mm and a length of 200 mm. A plurality of rotation bending fatigue test pieces, a plurality of test pieces B, and a plurality of bending amount measurement test pieces were provided, and each of them was subjected to a strain releasing heat treatment including heating and holding at a temperature for a time shown in the column of the strain releasing heat treatment of Table 1.

The rotation bending fatigue test piece and the bending amount measurement test piece were ground and subjected to a gas nitrocarburizing treatment including heating and holding at 600° C. for 2 hours under an ammonia gas atmosphere. The rotation bending fatigue test piece was provided to a rotation bending fatigue test to be described later and a hardness test after the nitrocarburizing treatment, and the bending amount measurement test piece was provided to the measurement of the bending amount in the nitrocarburizing treatment.

First, the bainite structure area ratio was measured and evaluated by observing a cross-section of the test piece A with an optical microscope and by performing image analysis. Here, a structure other than a ferrite structure was set as the bainite structure, and the ratio of the area of the bainite structure to the entire structure was calculated. In the case where the ratio was 70% or greater, the structure was evaluated to be good.

The machinability, particularly, the cutting processability after the hot forging was evaluated by measuring and using Rockwell hardness of the test piece A. That is, in the case where the hardness after hot forging was less than 33.0 HRC, the machinability was evaluated to be good.

The mechanical strength as a crankshaft was evaluated by measuring the rotation bending fatigue strength of the rotation bending fatigue test piece and the hardness of the same test piece. Regarding the rotation bending fatigue strength, an ONO-type rotation bending fatigue test device was used to obtain a SN curve, and critical stress at which rupture did not occur at a number of cycles of $10^7$ was measured. The measured result was set as a fatigue limit. In addition, regarding the hardness, the hardness of a core part of a transverse section of a shoulder part of the rotation bending fatigue test piece was measured using a Vickers hardness test device. Here, in the case where the rotation bending fatigue strength and the hardness of the core part are 535 MPa or greater and 270 Hv or greater, respectively, the mechanical strength was evaluated to be good.

Regarding the amount of residual γ, the amount of residual γ after the strain releasing heat treatment in the test piece B was measured using an X-ray diffraction device.

Regarding the straightness of the crankshaft after the nitrocarburizing treatment, the bending amounts of a plurality of bending amount measurement test pieces were measured, and an average value thereof and a standard deviation (σ) were obtained and evaluated. In this case, the bending amount measurement test piece was supported by a center hole provided at both ends, and at a central position in a longitudinal direction thereof, the bending amount was measured with a dial gauge. In the case where a bending amount average value +3σ was 50 μm or less, the straightness was evaluated to be good.

Next, the above-described test results will be described using Table 2.

TABLE 2

| | BAINITIC STRUCTURE AREA RATIO (%) | HARDNESS AFTER HOT FORGING (HRC) | INTERNAL HARDNESS AFTER NITROCARBURIZING TREATMENT (HV) | ROTATION BENDING FATIGUE STRENGTH (MPa) | AMOUNT OF RESIDUAL γ AFTER STRAIN RELEASING HEAT TREATMENT (%) | TP BENDING AMOUNT (μm) |
|---|---|---|---|---|---|---|
| TARGET VALUE | ≥70 | <33.0 | ≥270 | ≥535 | <5.0 | ≤50 |
| EXAMPLE 1 | 76 | 21.8 | 292 | 536 | 0.0 | 37 |
| EXAMPLE 2 | 100 | 30.1 | 328 | 588 | 0.0 | 41 |
| EXAMPLE 3 | 93 | 27.7 | 303 | 563 | 0.0 | 34 |
| EXAMPLE 4 | 84 | 25.4 | 322 | 561 | 0.0 | 38 |
| EXAMPLE 5 | 82 | 28.4 | 341 | 584 | 0.0 | 35 |
| EXAMPLE 6 | 100 | 28.2 | 320 | 572 | 0.0 | 45 |
| EXAMPLE 7 | 83 | 25.0 | 316 | 562 | 0.0 | 37 |
| EXAMPLE 8 | 88 | 26.9 | 318 | 562 | 0.0 | 44 |
| EXAMPLE 9 | 90 | 26.1 | 335 | 577 | 0.0 | 37 |
| EXAMPLE 10 | 88 | 27.1 | 322 | 566 | 0.0 | 42 |
| EXAMPLE 11 | 82 | 27.2 | 285 | 549 | 0.0 | 40 |
| EXAMPLE 12 | 100 | 30.1 | 363 | 606 | 0.0 | 39 |
| EXAMPLE 13 | 75 | 23.3 | 288 | 535 | 0.0 | 48 |
| EXAMPLE 14 | 100 | 28.7 | 330 | 574 | 0.0 | 39 |
| EXAMPLE 15 | 81 | 30.1 | 319 | 541 | 0.0 | 48 |
| EXAMPLE 16 | 82 | 27.3 | 317 | 548 | 0.0 | 38 |
| COMPARATIVE EXAMPLE 1 | 69 | 19.8 | 256 | 509 | 0.0 | 33 |
| COMPARATIVE EXAMPLE 2 | 100 | 36.9 | 422 | 651 | 14.1 | 81 |
| COMPARATIVE EXAMPLE 3 | 84 | 23.4 | 265 | 520 | 0.0 | 29 |

TABLE 2-continued

| | | | | | | |
|---|---|---|---|---|---|---|
| COMPARATIVE EXAMPLE 4 | 97 | 30.6 | 387 | 619 | 7.3 | 55 |
| COMPARATIVE EXAMPLE 5 | 67 | 21.7 | 259 | 523 | 0.0 | 32 |
| COMPARATIVE EXAMPLE 6 | 100 | 35.3 | 374 | 626 | 6.7 | 53 |
| COMPARATIVE EXAMPLE 7 | 100 | 33.4 | 378 | 629 | 12.5 | 76 |
| COMPARATIVE EXAMPLE 8 | 68 | 22.4 | 268 | 524 | 0.0 | 34 |
| COMPARATIVE EXAMPLE 9 | 100 | 33.5 | 386 | 635 | 10.9 | 67 |
| COMPARATIVE EXAMPLE 10 | 69 | 22.0 | 240 | 504 | 0.0 | 42 |
| COMPARATIVE EXAMPLE 11 | 100 | 33.7 | 393 | 643 | 8.5 | 63 |
| COMPARATIVE EXAMPLE 12 | 100 | 30.6 | 347 | 607 | 17.2 | 90 |
| COMPARATIVE EXAMPLE 13 | 91 | 28.0 | 261 | 513 | 0.0 | 41 |
| COMPARATIVE EXAMPLE 14 | 94 | 32.5 | 379 | 617 | 8.4 | 64 |
| COMPARATIVE EXAMPLE 15 | 100 | 34.4 | 385 | 624 | 5.4 | 52 |
| COMPARATIVE EXAMPLE 16 | 66 | 23.5 | 243 | 500 | 0.0 | 36 |
| COMPARATIVE EXAMPLE 17 | 98 | 32.0 | 359 | 593 | 6.1 | 55 |

| | EXPRESSION 1 | EXPRESSION 2 | EXPRESSION 3 | EXPRESSION 4 |
|---|---|---|---|---|
| TARGET VALUE | ≥0.72 | <0.65 | ≥0.54 | <0.70 |
| EXAMPLE 1 | 0.75 | 0.38 | 0.57 | −3.16 |
| EXAMPLE 2 | 1.02 | 0.62 | 0.74 | 0.29 |
| EXAMPLE 3 | 1.00 | 0.52 | 0.66 | −0.85 |
| EXAMPLE 4 | 0.87 | 0.46 | 0.65 | −0.70 |
| EXAMPLE 5 | 0.87 | 0.54 | 0.72 | −0.93 |
| EXAMPLE 6 | 0.99 | 0.52 | 0.69 | −0.65 |
| EXAMPLE 7 | 0.90 | 0.50 | 0.65 | −2.03 |
| EXAMPLE 8 | 0.92 | 0.49 | 0.65 | −0.56 |
| EXAMPLE 9 | 0.95 | 0.52 | 0.70 | −0.62 |
| EXAMPLE 10 | 0.92 | 0.47 | 0.67 | −1.00 |
| EXAMPLE 11 | 0.86 | 0.50 | 0.61 | −1.88 |
| EXAMPLE 12 | 0.98 | 0.58 | 0.80 | −1.51 |
| EXAMPLE 13 | 0.76 | 0.41 | 0.57 | −0.14 |
| EXAMPLE 14 | 0.99 | 0.54 | 0.69 | −0.67 |
| EXAMPLE 15 | 0.85 | 0.45 | 0.59 | 0.63 |
| EXAMPLE 16 | 0.84 | 0.45 | 0.61 | −1.00 |
| COMPARATIVE EXAMPLE 1 | 0.69 | 0.33 | 0.48 | −3.78 |
| COMPARATIVE EXAMPLE 2 | 1.19 | 0.73 | 0.94 | 2.73 |
| COMPARATIVE EXAMPLE 3 | 0.86 | 0.42 | 0.52 | −2.83 |
| COMPARATIVE EXAMPLE 4 | 1.03 | 0.60 | 0.83 | 1.23 |
| COMPARATIVE EXAMPLE 5 | 0.67 | 0.38 | 0.53 | −3.51 |
| COMPARATIVE EXAMPLE 6 | 1.13 | 0.65 | 0.86 | 1.30 |
| COMPARATIVE EXAMPLE 7 | 1.13 | 0.65 | 0.87 | 2.26 |
| COMPARATIVE EXAMPLE 8 | 0.71 | 0.40 | 0.53 | −3.51 |
| COMPARATIVE EXAMPLE 9 | 1.15 | 0.65 | 0.89 | 2.00 |
| COMPARATIVE EXAMPLE 10 | 0.69 | 0.38 | 0.47 | −3.17 |
| COMPARATIVE EXAMPLE 11 | 1.14 | 0.66 | 0.91 | 1.35 |
| COMPARATIVE EXAMPLE 12 | 1.03 | 0.59 | 0.80 | 3.18 |
| COMPARATIVE EXAMPLE 13 | 0.96 | 0.53 | 0.73 | −0.59 |
| COMPARATIVE EXAMPLE 14 | 1.05 | 0.59 | 0.83 | 0.86 |
| COMPARATIVE EXAMPLE 15 | 1.13 | 0.65 | 0.85 | 1.25 |

TABLE 2-continued

| COMPARATIVE EXAMPLE 16 | 0.68 | 0.36 | 0.46 | −3.71 |
| COMPARATIVE EXAMPLE 17 | 1.08 | 0.62 | 0.76 | 0.80 |

EXPRESSION 1: [C] + 0.27[Mn] + 0.32[Cr] + 0.27[Mo] + 0.38[V]
EXPRESSION 2: [C] + 0.01[Si] + 0.09[Mn] + 0.13[Cr] + 0.12[Mo] + 0.28[V]
EXPRESSION 3: [C] + 0.11[Si] + 0.11[Mn] + 0.09[Cr] + 0.21[Mo] + 0.60[V]
EXPRESSION 4: $21.6 + 14.2[C] + 1.5[Si] + 2.6[Mn] + 6.5[Cr] + 2.7[Mo] + 1.6[V] + 10^{-7} \times \gamma_{h1}^2 - 3.7 \times 10^{-3} \times \gamma_{h1}$
$\gamma_{h1}$ = (HOLDING TEMPERATURE OF STRAIN RELEASING HEAT TREATMENT + 273) × (20 + Log(HOLDING TIME OF STRAIN RELEASING HEAT TREATMENT))

In Examples 1 to 16, the bainite structure area ratio is 70% or greater, the internal (core part) hardness is 270 HV or greater, and the rotation bending fatigue strength is 535 MPa or greater. Higher mechanical strength can be obtained than in the cases of conventional products. Meanwhile, the hardness after hot forging is less than 33.0 HRC, and thus machining into a crankshaft shape is easily performed. In addition, the amount of residual γ after the strain releasing heat treatment can be reduced, and thus the bending does not occur after the nitrocarburizing treatment and a process for straightening is not required, whereby excellent manufacturability is obtained.

In the case where [M] represents a content of element M in terms of % by mass, values which are given through the following Expressions 1 to 4 are shown in Table 2.

$$[C]+0.27[Mn]+0.32[Cr]+0.27[Mo]+0.38[V] \quad \text{(Expression 1)}$$

$$[C]+0.01[Si]+0.09[Mn]+0.13[Cr]+0.12[Mo]+0.28[V] \quad \text{(Expression 2)}$$

$$[C]+0.11[Si]+0.11[Mn]+0.09[Cr]+0.21[Mo]+0.60[V] \quad \text{(Expression 3)}$$

$$21.6+14.2[C]+1.5[Si]+2.6[Mn]+6.5[Cr]+2.7[Mo]+1.6[V]+10^{-7}\times\gamma_{h1}^2-3.7\times10^{-3}\times\gamma_{h1} \quad \text{(Expression 4)}$$

The heating and holding temperature in the strain releasing heat treatment is represented by T (° C.), the holding time is represented by t (hr), and $\gamma_{h1}=(T+273)\times(20+\text{Log}(t))$ is set.

However, in Comparative Example 1 in which the content of C was smaller than the content in Example 1, the bainite structure area ratio was 69%, the internal hardness after the nitrocarburizing treatment was 256 Hv, and the rotation bending fatigue strength was 509 MPa. These were lower than the target values. In addition, compared to Examples 1 to 16, the value of Expression 1 was smaller, i.e., 0.69, and the value of Expression 3 was smaller, i.e., 0.48. In Comparative Example 2 in which the content of C was larger than the content in Example 2, the hardness after hot forging was 36.9 HRC and was greater than the upper limit of the target value. The amount of residual γ after the strain releasing heat treatment was 14.1% and was larger than the amounts in Examples 1 to 16, and the bending amount was 81 μm and was also greater than the upper limit of the target value. Since the same strain releasing heat treatment conditions as in Example 2 were employed, it is considered that the amount of residual γ before the strain releasing heat treatment was larger, and thus the residual γ was not sufficiently decomposed in the strain releasing heat treatment. In addition, compared to Examples 1 to 16, the value of Expression 2 was larger, i.e., 0.73, and the value of Expression 4 was larger, i.e., 2.73.

In Comparative Example 3 in which the content of Si is smaller than the content in Example 3, the internal hardness after the nitrocarburizing treatment was 265 Hv, and the rotation bending fatigue strength was 520 MPa. These were lower than the target values. In addition, compared to Examples 1 to 16, the value of Expression 3 was smaller, i.e., 0.52. In Comparative Example 4 in which the content of Si is larger than the content in Example 4, the amount of residual γ after the strain releasing heat treatment was 7.3% and was larger than the amounts in Examples 1 to 16, and the bending amount was 55 μm and was also greater than the upper limit of the target value. Since the same strain releasing heat treatment conditions as in Example 4 were employed, it is considered that the amount of residual γ before the strain releasing heat treatment was larger, and thus the residual γ was not sufficiently decomposed in the strain releasing heat treatment. In addition, compared to Examples 1 to 16, the value of Expression 4 was larger, i.e., 1.23.

In Comparative Example 5 in which the content of Mn was smaller than the content in Example 5, the bainite structure area ratio was 67%, the internal hardness after the nitrocarburizing treatment was 259 Hv, and the rotation bending fatigue strength was 523 MPa. These were lower than the target values. In addition, compared to Examples 1 to 16, the value of Expression 1 was smaller, i.e., 0.67, and the value of Expression 3 was smaller, i.e., 0.53. In Comparative Example 6 in which the content of Mn was larger than the content in Example 6, the hardness after hot forging was 35.3 HRC and was greater than the upper limit of the target value. The amount of residual γ after the strain releasing heat treatment was 6.7% and was larger than the amounts in Examples 1 to 16, and the bending amount was 53 μM and was also greater than the upper limit of the target value. Since the same strain releasing heat treatment conditions as in Example 6 were employed, it is considered that the amount of residual γ before the strain releasing heat treatment was larger, and thus the residual γ was not sufficiently decomposed in the strain releasing heat treatment. In addition, compared to Examples 1 to 16, the value of Expression 2 was larger, i.e., 0.65, and the value of Expression 4 was larger, i.e., 1.30.

In Comparative Example 7 in which the content of Cr is larger than the content in Example 8, the hardness after hot forging was 33.4 HRC and was greater than the upper limit of the target value, the amount of residual γ after the strain releasing heat treatment was larger, i.e., 12.5%, and the bending amount was 76 μm and was also greater than the upper limit of the target value. Since the same strain releasing heat treatment conditions as in Example 8 were employed, it is considered that the amount of residual γ before the strain releasing heat treatment was larger, and thus the residual γ was not sufficiently decomposed in the strain releasing heat treatment. In addition, compared to Examples 1 to 16, the value of Expression 2 was larger, i.e., 0.65, and the value of Expression 4 was larger, i.e., 2.26.

In Comparative Example 8 in which the content of Mo was smaller than the content in Example 9, the bainite structure area ratio was 68%, the internal hardness after the nitrocarburizing treatment was 268 Hv, and the rotation bending fatigue strength was 524 MPa. These were lower than the target values. In addition, compared to Examples 1 to 16, the value of Expression 1 was smaller, i.e., 0.71, and the value of Expression 3 was smaller, i.e., 0.53. In Comparative Example 9 in which the content of Mo was larger than the content in Example 10, the hardness after hot forging was 33.5 HRC and was greater than the upper limit of the target value. The amount of residual γ after the strain releasing heat treatment was 10.9% and was larger than the amounts in Examples 1 to 16, and the bending amount was 67 μm and was also greater than the upper limit of the target value. Since the same strain releasing heat treatment conditions as in Example 10 were employed, it is considered that the amount of residual γ before the strain releasing heat treatment was larger, and thus the residual γ was not sufficiently decomposed in the strain releasing heat treatment. In addition, compared to Examples 1 to 16, the value of Expression 2 was larger, i.e., 0.65, and the value of Expression 4 was larger, i.e., 2.00.

In Comparative Example 10 in which the content of V was smaller than the content in Example 11, the bainite structure area ratio was 69%, the internal hardness after the nitrocarburizing treatment was 240 Hv, and the rotation bending fatigue strength was 504 MPa. These were lower than the target values. In addition, compared to Examples 1 to 16, the value of Expression 1 was smaller, i.e., 0.69, and the value of Expression 3 was smaller, i.e., 0.47. In Comparative Example 11 in which the content of V was larger than the content in Example 12, the hardness after hot forging was 33.7 HRC and was greater than the upper limit of the target value. The amount of residual γ after the strain releasing heat treatment was 8.5% and was larger than the amounts in Examples 1 to 16, and the bending amount was 63 μm and was also greater than the upper limit of the target value. Since the same strain releasing heat treatment conditions as in Example 12 were employed, it is considered that the amount of residual γ before the strain releasing heat treatment was larger, and thus the residual γ was not sufficiently decomposed in the strain releasing heat treatment. In addition, compared to Examples 1 to 16, the value of Expression 2 was larger, i.e., 0.66, and the value of Expression 4 was larger, i.e., 1.35.

In Comparative Example 12 in which the temperature of the strain releasing heat treatment was reduced to extend the time of the strain releasing heat treatment compared to Example 13, the amount of residual γ after the strain releasing heat treatment was larger, i.e., 17.2%, and the bending amount was 90 μm and was also greater than the upper limit of the target value. It is considered that although the holding time of the strain releasing heat treatment was longer, the temperature was lower, and thus the residual γ was not sufficiently decomposed in the strain releasing heat treatment. In addition, compared to Examples 1 to 16, the value of Expression 4 was larger, i.e., 3.18. In Comparative Example 13 in which the temperature of the strain releasing heat treatment was increased to reduce the time of the strain releasing heat treatment compared to Example 14, the internal hardness after the nitrocarburizing treatment was 261 Hv, and the rotation bending fatigue strength was 513 MPa. These were lower than the target values. It is considered that although the holding time of the strain releasing heat treatment was shorter, the temperature was higher, and thus overaging occurred after the nitrocarburizing treatment, and the internal hardness after the nitrocarburizing treatment and the rotation bending fatigue strength were thus reduced.

In Comparative Example 14 having such a component composition that the contents of the respective components were the same as in Examples 1 to 16, the amount of residual γ after the strain releasing heat treatment was larger, i.e., 8.4%, and the bending amount was 64 μm and was also greater than the upper limit of the target value. Since the amount of residual γ before the strain releasing heat treatment was larger, it is considered that the residual γ was not sufficiently decomposed in the strain releasing heat treatment. In addition, compared to Examples 1 to 16, the value of Expression 4 was larger, i.e., 0.86.

In Comparative Example 15 having such a component composition that the contents of the respective components were the same as in Examples 1 to 16, the hardness after hot forging was 34.4 HRC and was greater than the upper limit of the target value, the amount of residual γ after the strain releasing heat treatment was larger, i.e., 5.4%, and the bending amount was 52 μm and was also greater than the upper limit of the target value. Since the amount of residual γ before the strain releasing heat treatment was larger, it is considered that the residual γ was not sufficiently decomposed in the strain releasing heat treatment. In addition, compared to Examples 1 to 16, the value of Expression 2 was larger, i.e., 0.65, and the value of Expression 4 was larger, i.e., 1.25.

In Comparative Example 16 having such a component composition that the contents of the respective components were the same as in Examples 1 to 16, the bainite structure area ratio was 66% and was lower than the target value, the internal hardness after the nitrocarburizing treatment was 243 Hv, and the rotation bending fatigue strength was 500 MPa and was lower than the target value. In addition, compared to Examples 1 to 16, the value of Expression 1 was smaller, i.e., 0.68, and the value of Expression 3 was smaller, i.e., 0.46.

In Comparative Example 17 having such a component composition that the contents of the respective components were the same as in Examples 1 to 16, the amount of residual 7 after the strain releasing heat treatment was larger, i.e., 6.1%, and the bending amount was 55 μm and was also greater than the upper limit of the target value. Since the amount of residual γ before the strain releasing heat treatment was larger, it is considered that the residual γ was not sufficiently decomposed in the strain releasing heat treatment. In addition, compared to Examples 1 to 16, the value of Expression 4 was larger, i.e., 0.80.

Accordingly, when referring to Comparative Examples 1, 5, 8, 10, and 16 in which the value of Expression 1 is smaller than in Examples 1 to 16, the target value of the value of Expression 1 is 0.72 or greater.

Also, when referring to Comparative Examples 2, 6, 7, 9, 11, and 15 in which the value of Expression 2 is larger than in Examples 1 to 16, the target value of the value of Expression 2 is smaller than 0.65.

Moreover, when referring to Comparative Examples 1, 3, 5, 8, 10, and 16 in which the value of Expression 3 is smaller than in Examples 1 to 16, the target value of the value of Expression 3 is 0.54 or greater.

Furthermore, when referring to Comparative Examples 2, 4, 6, 7, 9, 11, 12, 14, 15, and 17 in which the value of Expression 4 is larger than in Examples 1 to 16, the target value of the value of Expression 4 is smaller than 0.70.

In addition, when referring to Comparative Examples 2, 4, 6, 7, 9, 11, 12, 14, 15, and 17 in which the amount of residual γ after the strain releasing heat treatment is larger than the amounts in Examples 1 to 16 and the bending amount is thus increased, the target value of the amount of residual γ after the strain releasing heat treatment is less than 5.0%. In the case where such a target value is satisfied, the amount of residual γ is not increased due to the nitrocarburizing heat treatment, and even after the nitrocarburizing heat treatment, the amount of residual γ is less than 5.0%.

It was confirmed that in the case where the bending amount is small in Examples, the bending amount of an actual crankshaft manufactured under the same manufacturing conditions tends to be small. That is, in the actual crankshaft, as described above, when the amount of residual γ after the strain releasing heat treatment is reduced, the bending in the nitrocarburizing treatment can be suppressed and the bending straightening is thus not required. As the actual crankshaft, a crankshaft for a four-cylinder engine with a total length of approximately 450 mm and a journal diameter of approximately 55 mm was used and the confirmation was conducted.

As described above, according to Examples, (1) a heat treatment for tempering of martensite is omitted using a bainitic microalloyed steel, (2) using the bainitic microalloyed steel having a specific component composition, the amount of residual γ after forging is adjusted and a strain releasing heat treatment is performed after machining, whereby the "bending" in the next nitrocarburizing treatment can be suppressed and the mechanical strength of a part corresponding to a core part of the crankshaft is adjusted, and (3) the fatigue strength as the crankshaft is improved with a surface hardening treatment by the nitrocarburizing treatment. Particularly, by suppressing the "bending" in the nitrocarburizing treatment, a subsequent process for straightening is not required, whereby the crankshaft main body can be hardened to increase the mechanical strength thereof compared to conventional cases in the strain releasing heat treatment. That is, it is possible to obtain a nitrocarburized crankshaft having excellent manufacturability without sacrificing the mechanical strength as the crankshaft.

The range of the component composition considered for the above-described bainitic microalloyed steel is determined with the following guidelines. First, C, Si, Mn, Mo, and V, which are essential additional elements, will be described.

C contributes to the securing of mechanical strength as a crankshaft and the precipitation hardening in the strain releasing heat treatment and the nitrocarburizing treatment. In the case where C is excessively contained, the hardness as a hot-forged body is excessively increased, and thus the machinability as a hot-forged body is deteriorated and the amount of residual γ after the strain releasing heat treatment is increased, whereby the bending amount as a crankshaft is increased and the straightness is reduced. Accordingly, the content of C is controlled to be within a range of 0.10% to 0.40%, and preferably 0.15% to 0.30% in terms of mass %.

Si conducts deoxidation in the smelting of a steel material and increases the hardness as a crankshaft. In the case where Si is excessively contained, hot deformation resistance is excessively increased, and thus hot forgeability as a steel material is deteriorated. Accordingly, the content of Si is controlled to be within a range of from 0.10% to 1.0%, and preferably 0.30% to 0.70% in terms of mass %.

Mn increases hardenability to stabilize and strengthen a bainite structure. In the case where Mn is excessively contained, the hardness of a hot-forged body is excessively increased, and thus the machinability as a hot-forged body is deteriorated. Accordingly, the content of Mn is controlled to be within a range of from 1.0% to 2.0%, and preferably from 1.4% to 2.0% in terms of mass %.

Mo increases hardenability to stabilize and strengthen a bainite structure. In the case where Mo is excessively contained, hot deformation resistance is excessively increased, and thus hot forgeability is deteriorated, and the hardness of a hot-forged body is excessively increased, whereby the machinability as a hot-forged body is deteriorated. Accordingly, the content of Mo is controlled to be within a range of from 0.05% to 0.40%, and preferably from 0.15% to 0.35% in terms of mass %.

V increases hardenability to stabilize and strengthen a bainite structure. In the case where V is excessively contained, hot deformation resistance is excessively increased, and thus hot forgeability is deteriorated, and the hardness of a hot-forged body is excessively increased, whereby the machinability as a hot-forged body is deteriorated. Accordingly, the content of V is controlled to be within a range of from 0.05% to 0.40%, and preferably from 0.10% to 0.30% in terms of mass %.

Next, the reasons why the component ranges of S, Ti, Al, Cr, Cu, and Ni as arbitrary additional elements are determined and the reasons why the component range of P as an impurity element is determined will be described.

S forms a sulfide and increases the machinability as a hot-forged body. In the case where S is excessively contained, inclusions are generated, and thus the fatigue strength as a crankshaft is reduced. Accordingly, the content of S is controlled to be within a range of from 0.01% to 0.1% in terms of mass %.

Ti suppresses coarsening of austenite grains of a hot-forged body, and increases the machinability as a crankshaft. In the case where Ti is excessively contained, a nitride is generated in the nitrocarburizing treatment step. This nitride becomes a stress concentration source and can reduce the fatigue strength as a crankshaft. Accordingly, the content of Ti is controlled to be within a range of from 0.005% to 0.2% in terms of mass %.

Al is a deoxidizing agent in the smelting of a steel material. In the case where Al is excessively contained, a nitride is generated in the nitrocarburizing treatment step, a nitriding diffusion depth is reduced, and the fatigue strength as a crankshaft is reduced. Accordingly, the content of Al is controlled to be within a range of from 0.001% to 0.03% in terms of mass %.

Cr increases hardenability to stabilize and strengthen a bainite structure. In the case where Cr is excessively contained, the hardness of a hot-forged body is excessively increased, and thus the machinability as a hot-forged body is deteriorated. Accordingly, the content of Cr is controlled to be within a range of from 0.50% or less, and preferably 0.35% or less in terms of mass %.

Cu strengthens a bainite structure. In the case where Cu is excessively contained, hot deformation resistance is excessively increased, and thus hot forgeability is deteriorated. Accordingly, the content of Cu is controlled to be within a range of from 0.5% or less in terms of mass %.

Ni stabilizes and strengthens a bainite structure, and increases the machinability as a crankshaft. In addition, the generation of hot rolling scratches due to the addition of Cu is prevented. In the case where Ni is excessively contained, the hardness of a hot-forged body is excessively increased, and thus the machinability as a hot-forged body is deteriorated. Accordingly, the content of Ni is controlled to be within a range of from 0.5% or less in terms of mass %.

P reduces the strength of a grain boundary. In the case where the content of P is excessively suppressed, a time required for a refining process is increased, and thus cost increase is caused. Accordingly, the content of P is controlled to be from 0.025% or less in terms of mass %.

While the mode for carrying out the present invention has been described in detail above, the present invention is not limited to these embodiments, and various changes and modifications can be made therein without departing from the purport of the present invention.

Incidentally, this application is based on Japanese patent application No. 2013-096377 filed May 1, 2013, and the entire contents thereof being hereby incorporated by reference.

What is claimed is:

1. A nitrocarburized crankshaft obtained by
subjecting a bainitic microalloyed steel to a forging and a machining and
further subjecting the bainitic microalloyed steel to at least a strain releasing heat treatment and
a subsequent nitrocarburizing treatment,
the bainitic microalloyed steel containing, as essentially added elements, in terms of mass %:
0.16% to 0.40% of C;
0.13% to 1.0% of Si;
1.0% to 2.0% of Mn;
0.05% to 0.40% of Mo; and
0.05% to 0.30% of V, and the bainitic microalloyed steel optionally further containing, as arbitrarily added elements, in terms of mass %:
0.01% to 0.1% of S;
0.005% to 0.2% of Ti;
0.001% to 0.03% of Al;
0.50% or less of Cr;
0.5% or less of Cu; and
0.5% or less of Ni,
with the balance being Fe and unavoidable impurities,
wherein at least a content of P as one of the unavoidable impurities is suppressed to be 0.025% or less,
wherein the microalloyed steel satisfies the following expressions:

$$[C]+0.27[Mn]+0.32[Cr]+0.27[Mo]+0.38[V] \geq 0.72,$$

$$[C]+0.01[Si]+0.09[Mn]+0.13[Cr]+0.12[Mo]+0.28[V] < 0.65, \text{ and}$$

$$[C]+0.11[Si]+0.11[Mn]+0.09[Cr]+0.21[Mo]+0.60[V] \geq 0.54,$$

in which [M] represents a content of element M in terms of % by mass, and
wherein an amount of residual $\gamma$ is controlled to be less than 5.0%, and a core part has a hardness of 270 HV or greater.

2. A method of manufacturing a nitrocarburized crankshaft which is obtained by
subjecting a bainitic microalloyed steel to a forging and a machining, and
further subjecting the bainitic microalloyed steel to at least a strain releasing heat treatment and
a subsequent nitrocarburizing treatment,
the bainitic microalloyed steel containing, as essentially added elements, in terms of mass %:
0.16% to 0.40% of C;
0.13% to 1.0% of Si;
1.0% to 2.0% of Mn;
0.05% to 0.40% of Mo; and
0.05% to 0.30% of V, and the bainitic microalloyed steel optionally further containing, as arbitrarily added elements, in terms of mass %:
0.01% to 0.1% of S;
0.005% to 0.2% of Ti;
0.001% to 0.03% of Al;
0.50% or less of Cr;
0.5% or less of Cu; and
0.5% or less of Ni,
with the balance being Fe and unavoidable impurities,
wherein at least a content of P as one of the unavoidable impurities is suppressed to be 0.025% or less,
wherein the microalloyed steel is selected so as to satisfy:

$$[C]+0.27[Mn]+0.32[Cr]+0.27[Mo]+0.38[V] \geq 0.72,$$

$$[C]+0.01[Si]+0.09[Mn]+0.13[Cr]+0.12[Mo]+0.28[V] < 0.65, \text{ and}$$

$$[C]+0.11[Si]+0.11[Mn]+0.09[Cr]+0.21[Mo]+0.60[V] \geq 0.54,$$

in which [M] represents a content of element M in terms of % by mass, and
wherein the strain releasing heat treatment is performed to satisfy the following expressions regarding a holding temperature T (° C.) and a holding time t (hr):

$$21.6+14.2[C]+1.5[Si]+2.6[Mn]+6.5[Cr]+2.7[Mo]+1.6[V]+10^{-7} \times \gamma_{h1}{}^2 - 3.7 \times 10^{-3} \times \gamma_{h1} < 0.70,$$

and $$\gamma_{h1} = (T+273) \times (20+\text{Log}(t)).$$

3. The method of manufacturing a nitrocarburized crankshaft according to claim 2, wherein the nitrocarburizing treatment is performed for 0.5 hours or longer under a gas atmosphere at a temperature in a range of from 550° C. to 650° C., and a core part has a hardness of 270 HV or greater.

4. The method of manufacturing a nitrocarburized crankshaft according to claim 2, wherein the bainitic microalloyed steel is subjected to the forging after heating the bainitic microalloyed steel to a temperature in a range of 1150° C. or more and lower than 1350° C., and then the forged steel is at least cooled at a cooling rate controlled to be within a range of from 0.25° C./sec to 1.50° C./sec in a carbon diffusion temperature range, thereby obtaining a hardness of less than 33.0 HRC.

5. The method of manufacturing a nitrocarburized crankshaft according to claim 4, wherein in the strain releasing heat treatment, the holding temperature T is set in a range of from 400° C. to 600° C. and the holding time t is set in a range of from 0.5 hours to 5.0 hours so as to control an amount of residual $\gamma$ to less than 5.0%.

6. The method of manufacturing a nitrocarburized crankshaft according to claim 4, wherein the nitrocarburizing treatment is performed for 0.5 hours or longer under a gas atmosphere at a temperature in a range of from 550° C. to 650° C., and a core part has a hardness of 270 HV or greater.

7. The method of manufacturing a nitrocarburized crankshaft according to claim 5, wherein the nitrocarburizing treatment is performed for 0.5 hours or longer under a gas atmosphere at a temperature in a range of from 550° C. to 650° C., and a core part has a hardness of 270 HV or greater.

8. The method of manufacturing a nitrocarburized crankshaft according to claim 2, wherein in the strain releasing heat treatment, the holding temperature T is set in a range of from 400° C. to 600° C. and the holding time t is set in a range of from 0.5 hours to 5.0 hours so as to control an amount of residual $\gamma$ to less than 5.0%.

9. The method of manufacturing a nitrocarburized crankshaft according to claim 8, wherein the nitrocarburizing treatment is performed for 0.5 hours or longer under a gas atmosphere at a temperature in a range of from 550° C. to 650° C., and a core part has a hardness of 270 HV or greater.

* * * * *